(12) United States Patent
Hu et al.

(10) Patent No.: US 12,147,281 B2
(45) Date of Patent: Nov. 19, 2024

(54) SECURITY / AUTOMATION SYSTEM WITH BACKEND BACKUP OF DEVICE INFORMATION

(71) Applicant: Tyco Fire & Security GmbH, Schaffhausen (CH)

(72) Inventors: Andy Hu, Los Angeles, CA (US); David Laone, Milwaukee, WI (US); Ross Werner, San Francisco, CA (US); Heather J. Shook, Moundsville, WV (US)

(73) Assignee: TYCO FIRE & SECURITY GMBH, Schaffhausen (CH)

( * ) Notice: Subject to any disclaimer, the term of this patent is extended or adjusted under 35 U.S.C. 154(b) by 272 days.

(21) Appl. No.: 17/527,816

(22) Filed: Nov. 16, 2021

(65) Prior Publication Data
US 2023/0152868 A1    May 18, 2023

(51) Int. Cl.
*G06F 1/24* (2006.01)
*G06F 11/14* (2006.01)
*G06F 21/44* (2013.01)
*G06F 21/57* (2013.01)
*H04L 9/08* (2006.01)

(52) U.S. Cl.
CPC ............ *G06F 1/24* (2013.01); *G06F 11/1402* (2013.01); *G06F 11/1458* (2013.01); *G06F 21/44* (2013.01); *G06F 21/57* (2013.01); *H04L 9/0894* (2013.01)

(58) Field of Classification Search
CPC ..... G06F 1/24; G06F 11/1402; G06F 11/1458
USPC ........................................................ 713/189
See application file for complete search history.

(56) References Cited

U.S. PATENT DOCUMENTS

| | | | | |
|---|---|---|---|---|
| 11,503,465 | B2 * | 11/2022 | Tal ...................... | H04W 12/041 |
| 2010/0031058 | A1 * | 2/2010 | Kito ..................... | G06F 21/602 |
| | | | | 713/193 |
| 2010/0280635 | A1 * | 11/2010 | Cohn .................... | H04W 40/28 |
| | | | | 700/90 |
| 2016/0173464 | A1 * | 6/2016 | Wang .................... | H04L 65/103 |
| | | | | 713/171 |

OTHER PUBLICATIONS

Casey Crane, Symmetric Encryption 101: Definition, How It Works & When It's Used, Nov. 4, 2020, https://www.thesslstore.com/, https://www.thesslstore.com/blog/symmetric-encryption-101-definition-how-it-works-when-its-used/ (Year: 2020).*

* cited by examiner

*Primary Examiner* — Zi Ye
(74) *Attorney, Agent, or Firm* — ArentFox Schiff LLP

(57) ABSTRACT

Example implementations include a method, apparatus, and computer-readable medium comprising downloading, from a backend server of a security/automation system of a premises, to a reset or replacement control panel of the security/automation system, backed-up device information of one or more devices in the security/automation system; and resuming operation of the one or more devices in the security/automation system, using the backed-up device information downloaded to the reset or replacement control panel.

18 Claims, 4 Drawing Sheets

SECURITY / AUTOMATION SYSTEM WITH BACKEND BACKUP OF DEVICE INFORMATION

FIELD

The present disclosure relates generally to security/automation systems and methods, and more particularly, to information backup in security/automation systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method comprising downloading, from a backend server of a security/automation system of a premises, to a reset or replacement control panel of the security/automation system, backed-up device information of one or more devices in the security/automation system. The method further comprises resuming operation of the one or more devices in the security/automation system, using the backed-up device information downloaded to the reset or replacement control panel.

Another example implementation includes an apparatus comprising a memory storing instructions and a processor communicatively coupled with the memory. The processor is configured to execute the instructions to download, from a backend server of a security/automation system of a premises, to a reset or replacement control panel of the security/automation system, backed-up device information of one or more devices in the security/automation system. The processor is further configured to execute the instructions to resume operation of the one or more devices in the security/automation system, using the backed-up device information downloaded to the reset or replacement control panel.

Another example implementation includes an apparatus comprising means for downloading, from a backend server of a security/automation system of a premises, to a reset or replacement control panel of the security/automation system, backed-up device information of one or more devices in the security/automation system. The apparatus further comprises means for resuming operation of the one or more devices in the security/automation system, using the backed-up device information downloaded to the reset or replacement control panel.

Another example implementation includes a computer-readable medium (e.g., a non-transitory computer-readable medium) storing instructions executable by a processor. The instructions, when executed, cause the processor to download, from a backend server of a security/automation system of a premises, to a reset or replacement control panel of the security/automation system, backed-up device information of one or more devices in the security/automation system. The instructions, when executed, further cause the processor to resume operation of the one or more devices in the security/automation system, using the backed-up device information downloaded to the reset or replacement control panel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
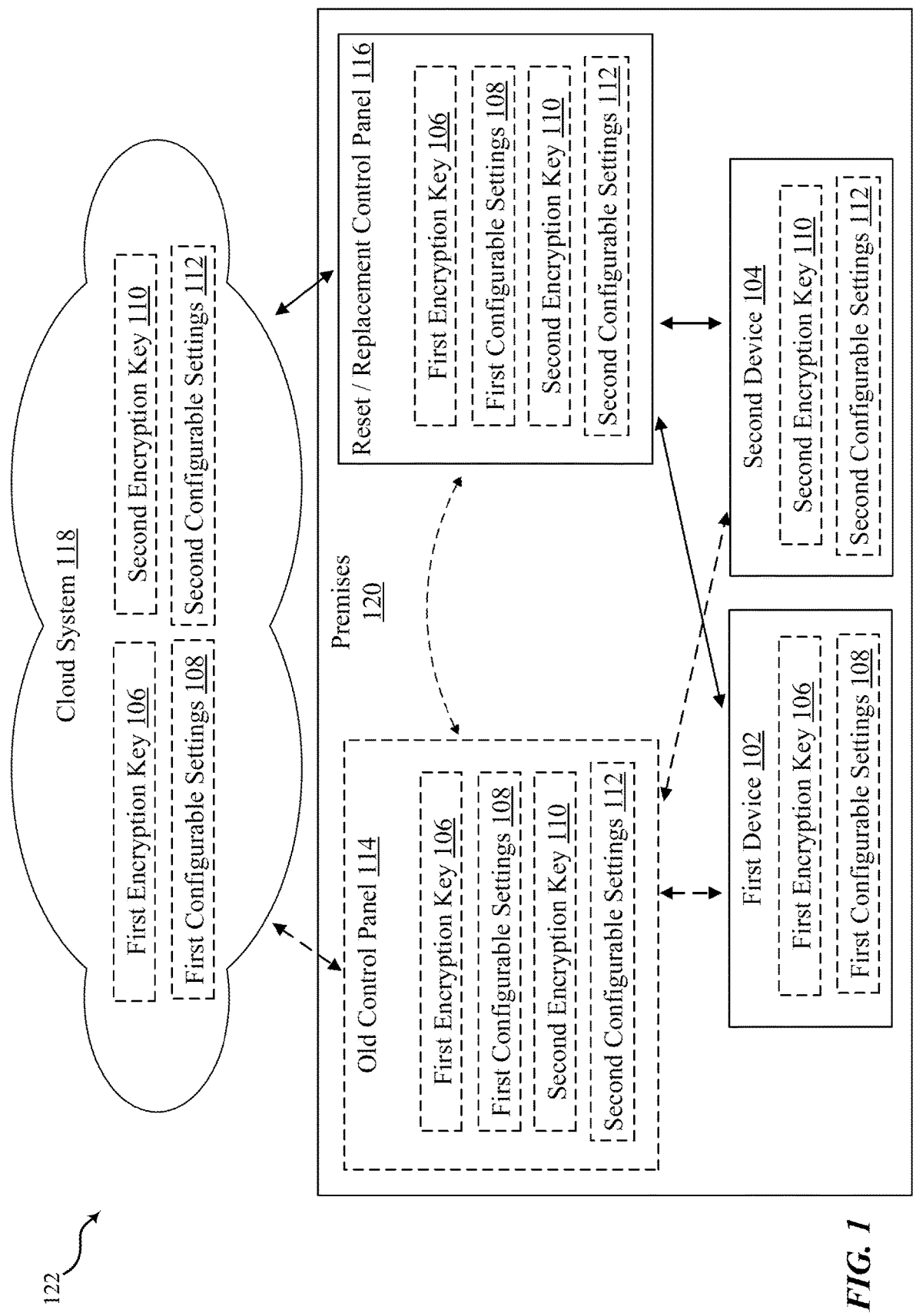
FIG. 1 is a schematic diagram of an example security/automation system including a reset/replacement control panel in communication with one or more devices at a premises, according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Some present aspects allow for seamless reset or replacement (swap) of a control panel of a security/automation system by downloading backend backup of device information to the reset or replacement control panel.

In one non-limiting aspect, for example, the initial pairing process of a device with a control panel in a security/automation system may establish a unique device-specific encryption key for communication of the control panel with that device. Such an encryption key, optionally along with associated device data that is needed for communication with that device, is then uploaded and saved to a backend server of the security/automation system (e.g., saved to a cloud system that supports the security/automation system).

In an alternative or additional non-limiting aspect, one or more configurable settings of a device may be backed up in the backend server. In an aspect, for example, the configurable settings may indicate whether certain capabilities of a device are enabled or disabled, a threshold that has been configured for the device, etc.

Subsequent to backing up the encryption keys and/or the configurable settings, if the control panel is reset or replaced, and if appropriate permissions are provided (e.g., if valid credentials are provided for the reset or replacement control panel), the backed-up data is downloaded from the backend server (e.g., from the cloud system) to the reset or replacement control panel. Accordingly, unlike conventional systems that require re-establishing encryption keys and/or re-configuring device settings after a control panel is reset or replaced, the present aspects quickly resume operation of sensors/devices in the security/automation system after a control panel is reset or replaced.

Specifically, for example, downloading backed-up encryption keys to the reset or replacement control panel causes automatic and immediate pairing of encrypted devices with the reset or replacement control panel, thus quickly resuming encrypted communication and other device functions in the security/automation system after a control panel is reset or replaced. Accordingly, unlike conventional systems that require a full pairing process to be repeated to re-establish encryption keys after a control panel is reset or replaced, the present aspects provide a faster and easier way to recover from a control panel reset or swap.

In an alternative or additional aspect, for example, downloading backed-up configurable settings of the devices causes automatic and immediate resumption of device functions in the security/automation system after a control panel is reset or replaced. Accordingly, unlike conventional systems, a user/installer does not have to manually configure those configurable settings after a control panel is reset or replaced.

Turning now to the figures, example aspects are depicted with reference to one or more components described herein, where components in dashed lines may be optional.

Referring to FIG. 1, for example, in one non-limiting aspect, a security/automation system 122 may include various devices 102, 104 installed throughout a premises 120, where the devices 102, 104 communicate with an old control panel 114 that is later reset to or replaced with a reset/replacement control panel 116. In some aspects, each of the devices 102, 104 may be, for example, a door/window displacement sensor, a temperature sensor, a smoke detector, a carbon monoxide (CO) detector, a heat detector, etc.

In an aspect, the old control panel 114 may implement encrypted 2-way communication with each of the devices 102, 104. In one non-limiting aspect, for example, 2-way radio-frequency (RF) communication between a device and the control panel may be encrypted, for example, by implementing advanced encryption standard-128 (AES-128) encryption. In one non-limiting aspect, for example, the encryption key may be derived from a Diffie-Hellman key exchange. Such encrypted 2-way communication may protect against spoof or replay attacks against the security/automation system 122.

In an aspect, using an enrollment process, each of the devices 102, 104 may be paired with the old control panel 114. During the enrollment process, each of the devices 102, 104 may exchange the required information with the old control panel 114 in order to establish the required encryption keys to encrypt and decrypt messages for encrypted communication. In an aspect, the old control panel 114 issues separate device-specific encryption keys for each device that is enrolled with the old control panel 114. For example, the old control panel 114 may issue a first encryption key 106 for encrypted communication with a first device 102, and may issue a second encryption key 110 for encrypted communication with the second device 104. The old control panel 114 stores all of the keys for the enrolled devices, and each device stores their respective encryption key. Although both the first device 102 and the second device 104 are described above as having device-specific encryption keys, the present aspects are not so limited, and security/automation system 122 may alternatively and/or additionally include one or more devices that implement unencrypted communication with the old control panel 114 and/or one or more devices that use a single shared encryption key for communicating with the old control panel 114.

In an aspect, the first encryption key 106 and the second encryption key 110 are stored on the old control panel 114, and are uploaded to and backed up in a server on a network (e.g., a cloud system 118). If the old control panel 114 is reset to or replaced with a reset/replacement control panel 116, and if appropriate credentials are provided to successfully authenticate the reset/replacement control panel 116, the first encryption key 106 and the second encryption key 110 are downloaded and restored to the reset/replacement control panel 116 from the cloud system 118. Accordingly, the reset/replacement control panel 116 has access to all the encryption keys, and therefore the first device 102 and the second device 104 do not need to be re-enrolled with the reset/replacement control panel 116. This is advantageous, for example, in large installation with many devices, since an installer would not need to walk through the installation and open each device for re-enrollment.

In some aspects, one or more configurable settings of the first device 102 and the second device 104 may be configured by the old control panel 114, e.g., one or more sensor detection thresholds, one or more settings indicating whether a device capability is enabled or disabled, or any other configurable device settings. For example, in an aspect, the old control panel 114 may configure first configurable settings 108 for the first device 102 and second configurable settings 112 for the second device 104 in the security/automation system 122. The first configurable settings 108 and the second configurable settings 112 are then uploaded to the cloud system 118, and if the old control panel 114 is reset to or replaced with the reset/replacement control panel 116, and if appropriate credentials are provided to successfully authenticate the reset/replacement control panel 116, the first configurable settings 108 and the second configurable settings 112 are downloaded and restored to the reset/replacement control panel 116 from the cloud system 118 to quickly resume operation of the first device 102 and the second device 104 in the security/automation system 122.

In some non-limiting aspects, for example, the first device 102 and the second device 104 in the security/automation system 122 may include one or more multi-capability devices that each provide more than one capability or functionality, such as a combination device that includes a door/window displacement sensor and a temperature sensor (e.g., reporting a door/window state as well as a temperature value), a combination smoke/carbon monoxide (CO)/heat detector, etc. In these aspects, the old control panel 114 may enable or disable one or more capabilities of a multi-capability device. In an aspect, for example, the old control panel 114 may save battery life of a multi-capability device by disabling one or more capabilities. In some aspects, a multi-capability device may indicate a unique device identifier (ID) and one or more capabilities of the multi-capability device to the old control panel 114, and the old control panel 114 may set which capabilities of the multi-capability device are enabled or disabled. In an aspect, each capability of the multi-capability device has configurable settings, and the old control panel 114 may program those settings on the multi-capability device. In some non-limiting aspects, configuration settings that indicate enabled/disabled capabilities of the multi-capability device may be uploaded and saved to the cloud system 118, and if the old control panel 114 is reset to or replaced with the reset/replacement control panel 116, and if appropriate credentials are provided to successfully authenticate the reset/replacement control panel 116, the configuration settings are downloaded and restored to the reset/replacement control panel 116 from the cloud system 118 to quickly resume operation of the multi-capability device in the security/automation system 122.

In some non-limiting aspects, the old control panel 114 may need to be reset or replaced, for example, when the old control panel 114 is damaged or is defective. In an aspect, for example, the old control panel 114 may need to be reset or replaced due to burglary or home intrusion at the premises 120, due to an accident at the premises 120, etc.

In some non-limiting aspects, the process of resetting or replacing the old control panel 114 may be initiated via a remote server of the security/automation system 122, for example, via the cloud system 118. In an aspect, the cloud system 118 maintains device data including a list of the devices in the security/automation system 122, optionally along with device-specific encryption keys and/or associated configurable thresholds (e.g., sensor detection thresholds) and/or settings (e.g., enabled/disabled) of the first device 102 and the second device 104 in the security/automation system 122. The device data may include, for each device, one or more of: a short ID, a long ID, system tokens, sensor electronic serial number, etc. The device data stored in the cloud system 118 may be password protected to preserve privacy and prevent malicious takeover of the security/automation system 122. The device data may include all the information that is exchanged between each device and the old control panel 114 during enrollment, and all of the subsequent device configuration changes made via the old control panel 114.

In an aspect, the old control panel 114 may be identified in the cloud system 118 via information stored for a customer that owns the security/automation system 122, e.g., customer name and associated identifying information such as customer address, security codes configured for the old control panel 114 for different users or the installer, etc. In addition, the device data may be stored in association with an International Mobile Equipment Identity (IMEI) of the old control panel 114. In order to reset/replace the old control panel 114 to the reset/replacement control panel 116, the device data stored in the cloud system 118 needs to be updated to be associated with the IMEI of the reset/replacement control panel 116. For example, the customer may provide appropriate credentials (e.g., via a two-factor authentication) to log into an account hosted on the cloud system 118, access the device data stored in the cloud system 118, and update the device data to be associated with the IMEI of the reset/replacement control panel 116. The customer may perform the aforementioned access and IMEI swap via the reset/replacement control panel 116 or via a computing device separate from the reset/replacement control panel 116, such as a personal computer. Subsequently, if the reset/replacement control panel 116 is powered ON and is connected (e.g., through a Wireless Fidelity (Wi-Fi) connection or through a cellular connection), the process of downloading the device data from the cloud system 118 to the reset/replacement control panel 116 may be initiated, for example, via the reset/replacement control panel 116 or via a computing device separate from the reset/replacement control panel 116, so that the reset/replacement control panel 116 may resume operation in the security/automation system 122.

In some non-limiting aspects, some devices in the security/automation system 122 may use one-way unencrypted communication. For these devices, the device data stored in the cloud system 118 does not include a device-specific encryption key, and the reset/replacement control panel 116 may resume unencrypted communicating with these devices based on, for example, downloaded device data such as sensor name or sensor ID.

In some non-limiting aspects, for example, some devices in the security/automation system 122 may communicate according to the Power-G protocol, and the old control panel 114 may use a single encryption key for communicating with multiple Power-G devices. In this case, the encryption key, along with device names or IDs, may be downloaded to a reset/replacement control panel 116 to resume Power-G communication with these devices. Accordingly, an installer does not have to manually pair each of these devices (e.g., does not need to interact with the devices and/or with a user interface of the reset/replacement control panel 116 to re-initialize the devices and pair the devices with the reset/replacement control panel 116).

In some non-limiting aspects, for example, some devices may communicate according to the ZigBee protocol, and the old control panel 114 may optionally use multiple device-specific encryption keys for communicating with each of these devices. In this case, the device-specific encryption keys, along with device names or IDs and corresponding device information (e.g., information indicating sensor 001 is a door sensor, sensor 002 is a motion detector, etc.), may be automatically downloaded and pushed to the reset/replacement control panel 116 to resume ZigBee communication with these devices.

In some non-limiting aspects, for example, some devices may communicate according to the Wi-Fi or Bluetooth protocol, and these devices may need to be paired again after the old control panel 114 is reset to or replaced with the reset/replacement control panel 116. That is, an installer may have to manually pair each of these devices (e.g., may need to interact with the devices and/or with a user interface of the reset/replacement control panel 116 to re-initialize the devices and pair the devices with the reset/replacement control panel 116 for Wi-Fi or Bluetooth communication).

Figure 2:
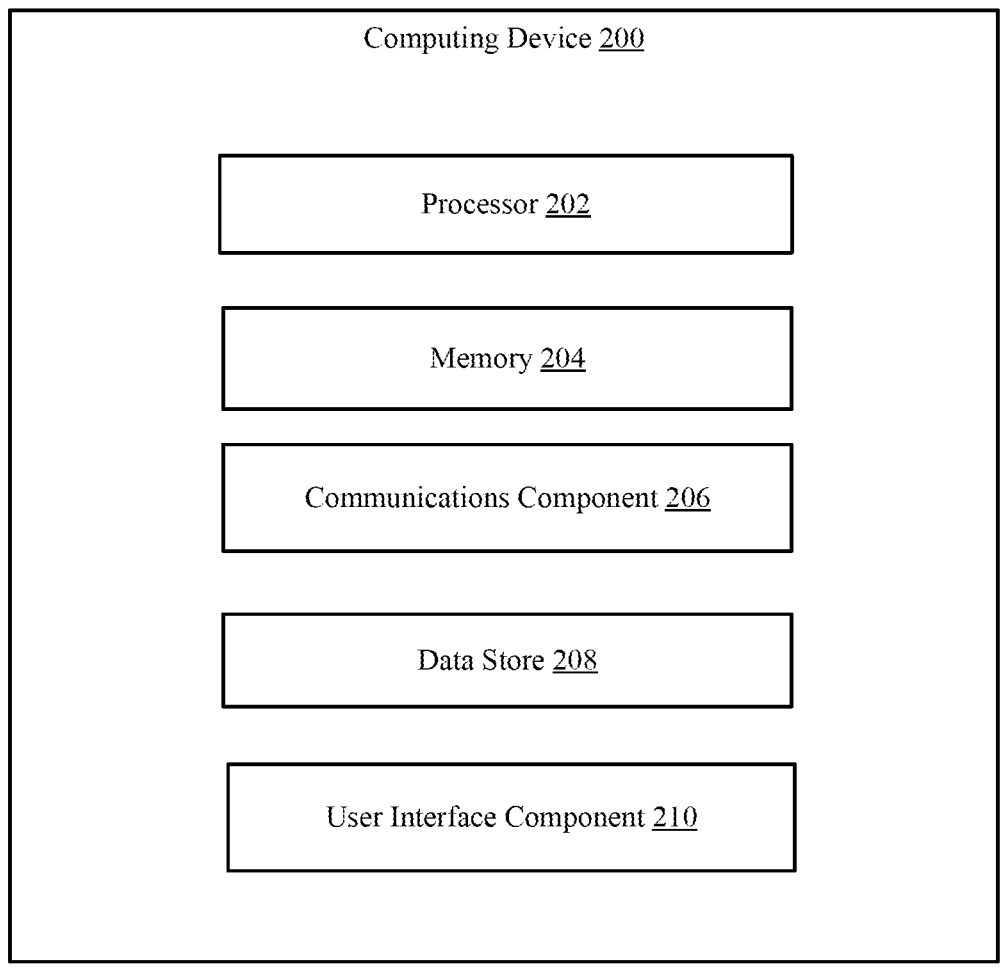
FIG. 2 is a block diagram of an example computing device which may implement all or a portion of a control panel, a device, or any other component in FIG. 1, according to some aspects.

FIG. 2 illustrates an example block diagram providing details of computing components in a computing device 200 that may implement all or a portion of one or more components in a control panel, a cloud system, a device, or any other component described above. The computing device 200 includes a processor 202 which may be configured to execute or implement software, hardware, and/or firmware modules that perform any functionality described above with reference to one or more components in a control panel, a device, a cloud system, or any other component described above. For example, the processor 202 may be configured to execute instructions to provide control panel reset/replacement functionality, as described herein with reference to various aspects.

The processor 202 may be a micro-controller and/or may include a single or multiple set of processors or multi-core processors. Moreover, the processor 202 may be implemented as an integrated processing system and/or a distributed processing system. The computing device 200 may further include a memory 204, such as for storing local versions of applications being executed by the processor 202, related instructions, parameters, etc. The memory 204 may include a type of memory usable by a computer, such as random access memory (RAM), read only memory (ROM), tapes, flash drives, magnetic discs, optical discs, volatile memory, non-volatile memory, and any combination thereof. Additionally, the processor 202 and the memory 204 may include and execute an operating system executing on the processor 202, one or more applications, display drivers, etc., and/or other components of the computing device 200.

Further, the computing device 200 may include a communications component 206 that provides for establishing and maintaining communications with one or more other devices, parties, entities, etc., utilizing hardware, software, and services. The communications component 206 may carry communications between components on the computing device 200, as well as between the computing device 200 and external devices, such as devices located across a communications network and/or devices serially or locally connected to the computing device 200. For example, the communications component 206 may include one or more buses, and may further include transmit chain components and receive chain components associated with a wireless or wired transmitter and receiver, respectively, operable for interfacing with external devices.

Additionally, the computing device 200 may include a data store 208, which can be any suitable combination of hardware and/or software, that provides for mass storage of information, databases, and programs. For example, the data store 208 may be or may include a data repository for applications and/or related parameters not currently being executed by the processor 202. In addition, the data store 208 may be a data repository for an operating system, application, display driver, etc., executing on the processor 202, and/or one or more other components of the computing device 200.

The computing device 200 may also include a user interface component 210 operable to receive inputs from a user of the computing device 200 and further operable to generate outputs for presentation to the user (e.g., via a display interface to a display device). The user interface component 210 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 210 may include one or more output devices, including but not limited to a display interface, a speaker, a haptic feedback mechanism, a printer, any other mechanism capable of presenting an output to a user, or any combination thereof.

Figure 3:
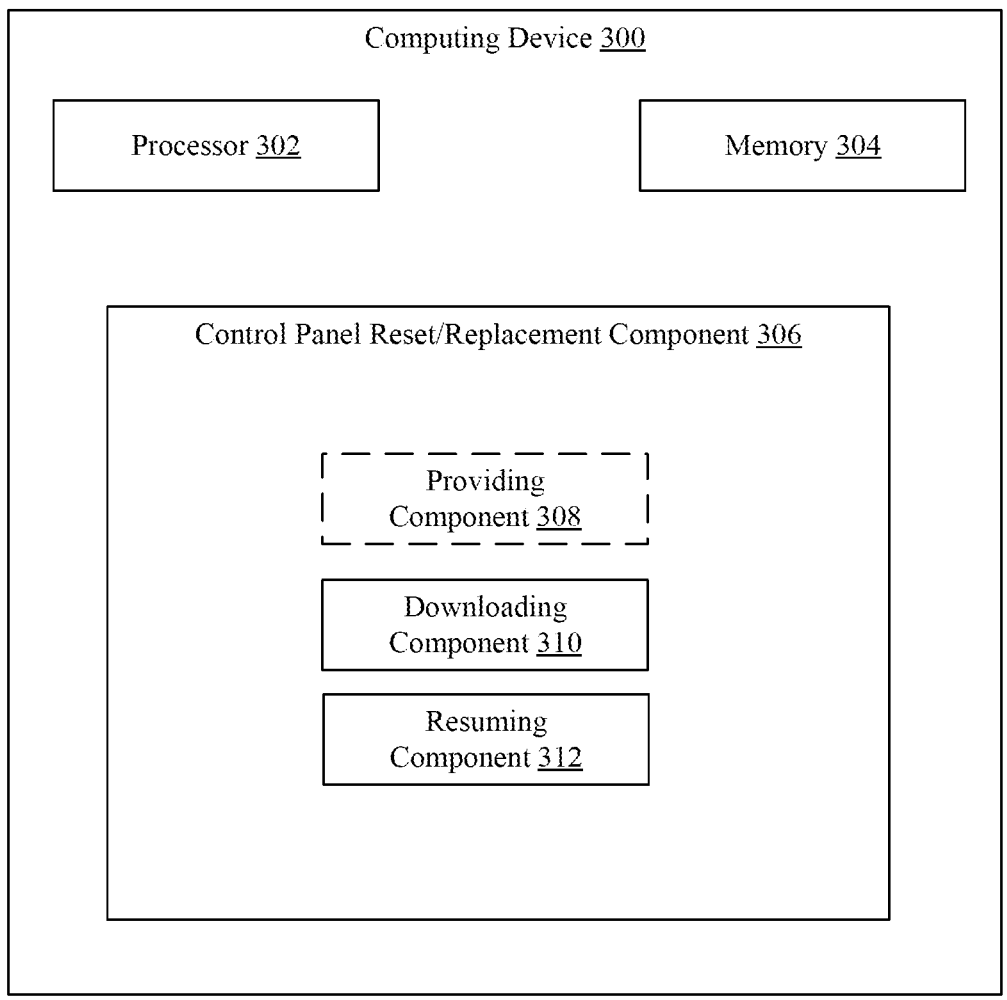
FIG. 3 is a block diagram of an example computing device which may implement all or a portion of a control panel in FIG. 1, according to some aspects.
Figure 4:
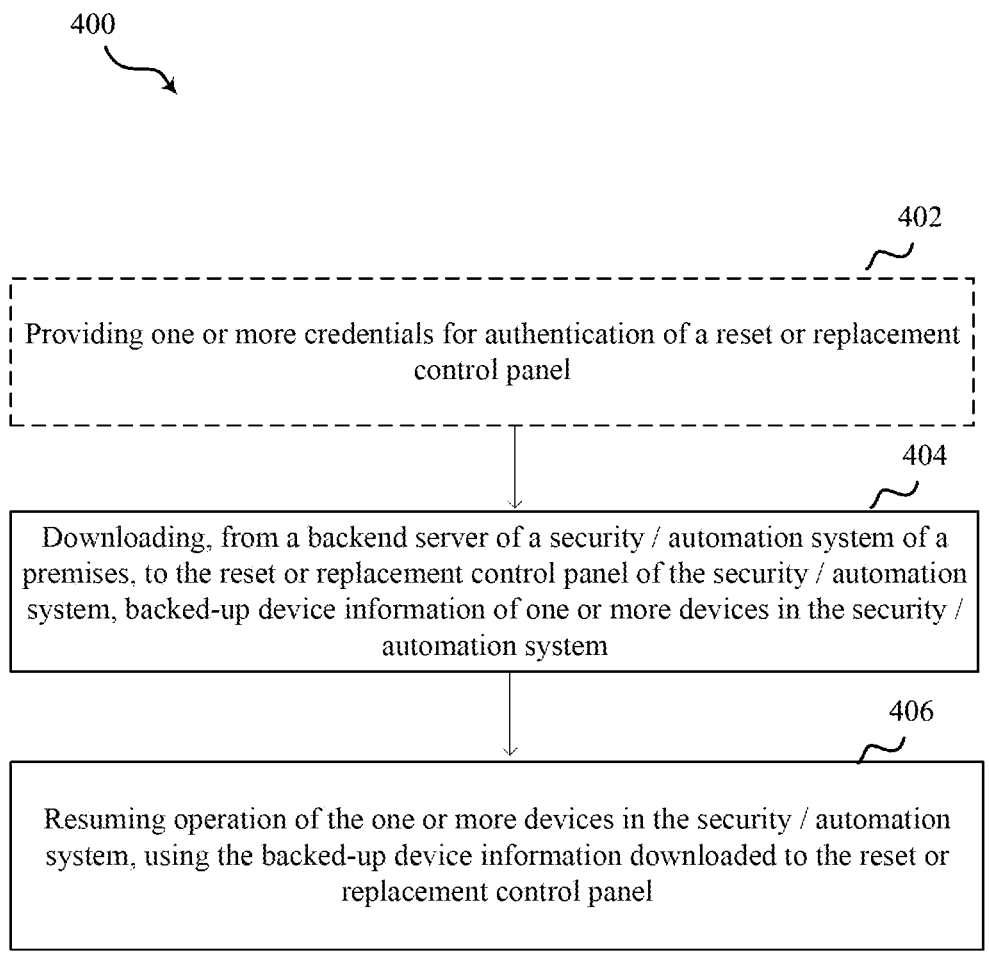
FIG. 4 is a flow diagram of an example method for resuming operation of a reset/replacement control panel, according to some aspects.

Referring to FIGS. 3-4, in operation for control panel reset/replacement functionality, a computing device 300 may implement at least a portion of one or more components in FIGS. 1-2 above, such as all or at least a portion of the reset/replacement control panel 116 or a component in the cloud system 118 in FIG. 1, and may perform method 400 such as via execution of control panel reset/replacement component 306 by processor 302 and/or memory 304. Specifically, computing device 300 may be configured to perform method 400 for performing an aspect of control panel reset/replacement functionality, as described herein. It should be noted that computing device 300, processor 302, and memory 304 may be the same or similar to computing device 200, processor 202, and memory 204 as described above with respect to FIG. 2.

The below description of method 400 begins with optional block 402, which may be optionally performed prior to block 404.

Referring to FIG. 4, in one optional implementation, at block 402, the method 400 may include providing one or more credentials for authentication of a reset or replacement control panel. For example, in an aspect, computing device 300, processor 302, memory 304, control panel reset/replacement component 306, and/or providing component 308 may be configured to or may comprise means for providing one or more credentials for authentication of a reset or replacement control panel.

For example, in an aspect, the providing at block 402 may include a customer associated with the security/automation system 122 of the premises 120 providing one or more credentials for authentication of the reset/replacement control panel 116. For example, the customer may provide appropriate credentials (e.g., via a two-factor authentication) to log into an account hosted on the cloud system 118 and authenticate the reset/replacement control panel 116 to initiate the process of resetting or replacing the old control panel 114 with the reset/replacement control panel 116. The customer may provide the credentials, for example, via the reset/replacement control panel 116 or via a computing device separate from the reset/replacement control panel 116, such as a personal computer, a mobile device, etc.

At block 404, the method 400 includes downloading, from a backend server of a security/automation system of a premises, to a reset or replacement control panel of the security/automation system, backed-up device information of one or more devices in the security/automation system. For example, in an aspect, computing device 300, processor 302, memory 304, control panel reset/replacement component 306, and/or downloading component 310 may be configured to or may comprise means for downloading, from a backend server of a security/automation system of a premises, to a reset or replacement control panel of the security/automation system, backed-up device information of one or more devices in the security/automation system.

For example, in an aspect, the downloading at block 404 may include downloading device information that is stored in the cloud system 118 to the reset/replacement control panel 116, where the device information includes backed-up device information of the first device 102 and the second device 104 in the security/automation system 122 of the premises 120.

In an optional aspect, downloading the backed-up device information to the reset/replacement control panel 116 is responsive to a successful authentication of the reset/replacement control panel 116 at block 402.

At block 406, the method 400 includes resuming operation of the one or more devices in the security/automation system, using the backed-up device information downloaded to the reset or replacement control panel. For example, in an aspect, computing device 300, processor 302, memory 304, control panel reset/replacement component 306, and/or resuming component 312 may be configured to or may comprise means for resuming operation of the one or more devices in the security/automation system, using the backed-up device information downloaded to the reset or replacement control panel.

For example, in an aspect, the resuming at block 406 may include the reset/replacement control panel 116 resuming operation of the first device 102 and the second device 104 in the security/automation system 122 of the premises 120, using the backed-up device information downloaded to the reset/replacement control panel 116 from the cloud system 118, such as the first encryption key 106 and/or the first configurable settings 108 of the first device 102, and the second encryption key 110 and/or the second configurable settings 112 of the second device 104.

In one optional aspect, the backed-up device information comprises an encryption key configured for encrypted communication between the reset or replacement control panel and a device in the security/automation system. For example, the reset/replacement control panel 116 may resume encrypted communication with the first device 102 using the first encryption key 106 downloaded to the reset/replacement control panel 116 from the cloud system 118. Similarly, the reset/replacement control panel 116 may resume encrypted communication with the second device 104 using the second encryption key 110 downloaded to the reset/replacement control panel 116 from the cloud system 118.

In one optional aspect, the encryption key is unique to the device as compared to one or more other devices in the security/automation system. For example, in an aspect, the first encryption key 106 is unique to the first device 102 and the second encryption key 110 is unique to the second device 104.

In one optional aspect, the encryption key has been generated responsive to the device having been paired with a control panel that is reset to or replaced with the reset or replacement control panel. For example, in an aspect, the first encryption key 106 has been generated responsive to the first device 102 having been paired with the old control panel 114 that is being reset to or replaced with the reset/replacement control panel 116. The second encryption key 110 may be similarly generated.

In one optional aspect, the encryption key has been uploaded to the backend server from a control panel that is being reset to or being replaced with the reset or replacement control panel. For example, the first encryption key 106 may have been uploaded to the cloud system 118 by the old control panel 114 that is being reset to or replaced with the reset/replacement control panel 116. The second encryption key 110 may be similarly uploaded.

In one optional aspect, the backed-up device information comprises one or more configurable settings of a device in the security/automation system. For example, the first configurable settings 108 of the first device 102 and the second configurable settings 112 of the second device 104 may be backed up and saved in the cloud system 118.

In one optional aspect, the one or more configurable settings indicate whether one or more capabilities of the device are enabled or disabled. For example, the first configurable settings 108 of the first device 102 may indicate whether a capability of the first device 102 is enabled or disabled (e.g., a capability to sense temperature, detect door/window open/close status, detect smoke or fire, etc.). The second configurable settings 112 of the second device 104 may provide similar functionality.

In one optional aspect, the one or more configurable settings indicate one or more threshold values configured for the device. For example, the first configurable settings 108 may indicate a detection threshold of a sensor in the first device 102 (e.g., a temperature detection threshold, detect door/window open/close detection threshold, a smoke or fire detection threshold, etc.). The second configurable settings 112 of the second device 104 may provide similar functionality.

In one optional aspect, the one or more configurable settings have been configured by a control panel that is being reset to or being replaced with the reset or replacement control panel. For example, the first configurable settings 108 of the first device 102 and the second configurable settings 112 of the second device 104 may have been configured by the old control panel 114 that is being reset to or replace with the reset/replacement control panel 116.

In one optional aspect, the one or more configurable settings have been configured based on user input received via a user interface of a control panel that is being reset to or being replaced with the reset or replacement control panel. For example, the first configurable settings 108 of the first device 102 and the second configurable settings 112 of the second device 104 may have been configured based on user input received via a user interface of the old control panel 114 that is being reset to or replace with the reset/replacement control panel 116.

In one optional aspect, the one or more configurable settings have been uploaded to the backend server from a control panel that is being reset to or being replaced with the reset or replacement control panel. For example, the first configurable settings 108 of the first device 102 and the second configurable settings 112 of the second device 104 may have been uploaded to the cloud system 118 from the old control panel 114 that is being reset to or replace with the reset/replacement control panel 116.

In one optional aspect, the backend server comprises a cloud system 118 that supports the security/automation system 122.

Some further example aspects are provided below.

1. A method comprising:
  downloading, from a backend server of a security/automation system of a premises, to a reset or replacement control panel of the security/automation system, backed-up device information of one or more devices in the security/automation system; and
  resuming operation of the one or more devices in the security/automation system, using the backed-up device information downloaded to the reset or replacement control panel.

2. The method of clause 1, further comprising:
  providing one or more credentials for authentication of the reset or replacement control panel; and
  wherein downloading the backed-up device information to the reset or replacement control panel is responsive to a successful authentication of the reset or replacement control panel.

3. The method of any of the above clauses, wherein the backed-up device information comprises an encryption key configured for encrypted communication between the reset or replacement control panel and a device in the security/automation system.

4. The method of any of the above clauses, wherein the encryption key is unique to the device as compared to one or more other devices in the security/automation system.

5. The method of any of the above clauses, wherein the encryption key has been generated responsive to the device having been paired with a control panel that is reset to or replaced with the reset or replacement control panel.

6. The method of any of the above clauses, wherein the encryption key has been uploaded to the backend server from a control panel that is being reset to or being replaced with the reset or replacement control panel.

7. The method of any of the above clauses, wherein the backed-up device information comprises one or more configurable settings of a device in the security/automation system.

8. The method of any of the above clauses, wherein the one or more configurable settings indicate whether one or more capabilities of the device are enabled or disabled.

9. The method of any of the above clauses, wherein the one or more configurable settings indicate one or more threshold values configured for the device.

10. The method of any of the above clauses, wherein the one or more configurable settings have been configured by a control panel that is being reset to or being replaced with the reset or replacement control panel.

11. The method of any of the above clauses, wherein the one or more configurable settings have been configured based on user input received via a user interface of a control panel that is being reset to or being replaced with the reset or replacement control panel.

12. The method of any of the above clauses, wherein the one or more configurable settings have been uploaded to the backend server from a control panel that is being reset to or being replaced with the reset or replacement control panel.

13. The method of any of the above clauses, wherein the backend server comprises a cloud system that supports the security/automation system An apparatus comprising:
a memory storing instructions; and
a processor communicatively coupled with the memory and configured to execute the instructions to perform the method of any of the above clauses.

A non-transitory computer-readable medium storing instructions executable by a processor that, when executed, cause the processor to perform the method of any of the above clauses.

An apparatus comprising means for performing the method of any of the above clauses.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method comprising:
downloading, from a backend server of a security/automation system of a premises, to a first control panel of the security/automation system, backed-up device information of one or more devices in the security/automation system, wherein the backed-up device information comprises a first encryption key and a second encryption key different than the first encryption key, wherein the first encryption key is generated during pairing of a first device with a second control panel of the security/automation system for a first encrypted communication between the first device and the second control panel of the security/automation system, wherein the second encryption key is generated during pairing of a second device with the second control panel for a second encrypted communication between the second device and the second control panel, wherein the first control panel comprises a reset or replacement of the second control panel; and
resuming operation of the one or more devices in the security/automation system, using the backed-up device information downloaded to the first control panel, wherein resuming the operation comprises:
using the first encryption key generated during pairing of the first device with the second control panel to automatically pair the first device with the first control panel and establish a third encrypted communication between the first device and the first control panel; and
using the second encryption key generated during pairing of the second device with the second control panel to automatically pair the second device with the first control panel and establish a fourth encrypted communication between the second device and the first control panel.

2. The method of claim 1, further comprising:
receiving one or more credentials for authentication of the first control panel; and
wherein downloading the backed-up device information to the first control panel is responsive to a successful authentication of the first control panel.

3. The method of claim 1, wherein the first encryption key is unique to the first device as compared to one or more other devices in the security/automation system.

4. The method of claim 1, wherein the first encryption key and the second encryption key have been uploaded to the backend server from the second control panel that is being reset to or being replaced with the first control panel.

5. The method of claim 1, wherein the backed-up device information further comprises one or more configurable settings of the first device in the security/automation system.

6. The method of claim 5, wherein the one or more configurable settings indicate whether one or more sensors of the first device are enabled or disabled.

7. The method of claim 5, wherein the one or more configurable settings indicate one or more threshold values configured for the first device.

8. The method of claim 5, wherein the one or more configurable settings have been configured by the second control panel that is being reset to or being replaced with the first control panel.

9. The method of claim 5, wherein the one or more configurable settings have been configured based on user input received via a user interface of the second control panel that is being reset to or being replaced with the first control panel.

10. The method of claim 5, wherein the one or more configurable settings have been uploaded to the backend server from the second control panel that is being reset to or being replaced with the first control panel.

11. The method of claim 1, wherein the backend server comprises a cloud system that supports the security/automation system.

12. The method of claim 1, wherein, prior to the downloading, the method further comprises:
  pairing the first device with the second control panel, including generating the first encryption key for the first encrypted communication between the first device and the second control panel;
  uploading the first encryption key from the second control panel to the backend server;
  pairing the second device with the second control panel, including generating the second encryption key for the second encrypted communication between the second device and the second control panel; and
  uploading the second encryption key from the second control panel to the backend server.

13. An apparatus comprising:
  a memory storing instructions; and
  a processor communicatively coupled with the memory and configured to execute the instructions to:
    download, from a backend server of a security/automation system of a premises, to a first control panel of the security/automation system, backed-up device information of one or more devices in the security/automation system, wherein the backed-up device information comprises a first encryption key and a second encryption key different than the first encryption key, wherein the first encryption key is generated during pairing of a first device with a second control panel of the security/automation system for a first encrypted communication between the first device and the second control panel of the security/automation system, wherein the second encryption key is generated during pairing of a second device with the second control panel for a second encrypted communication between the second device and the second control panel, wherein the first control panel comprises a reset or replacement of the second control panel; and
    resume operation of the one or more devices in the security/automation system, using the backed-up device information downloaded to the first control panel, wherein resuming the operation comprises:
      using the first encryption key generated during pairing of the first device with the second control panel to automatically pair the first device with the first control panel and establish a third encrypted communication between the first device and the first control panel; and
      using the second encryption key generated during pairing of the second device with the second control panel to automatically pair the second device with the first control panel and establish a fourth encrypted communication between the second device and the first control panel.

14. The apparatus of claim 13, wherein the first encryption key is unique to the first device as compared to one or more other devices in the security/automation system.

15. The apparatus of claim 13, wherein the first encryption key and the second encryption key have been uploaded to the backend server from the second control panel that is being reset to or being replaced with the first control panel.

16. The apparatus of claim 13, wherein the backed-up device information further comprises one or more configurable settings of the first device in the security/automation system.

17. The apparatus of claim 16, wherein the one or more configurable settings indicate whether one or more sensors of the first device are enabled or disabled or indicate one or more threshold values configured for the first device, wherein the one or more configurable settings have been configured based on user input received via a user interface of the second control panel that is being reset to or being replaced with the first control panel.

18. A non-transitory computer-readable medium comprising instructions executable by a processor that, when executed, cause the processor to:
  download, from a backend server of a security/automation system of a premises, to a first control panel of the security/automation system, backed-up device information of one or more devices in the security/automation system, wherein the backed-up device information comprises a first encryption key and a second encryption key different than the first encryption key, wherein the first encryption key is generated during pairing of a first device with a second control panel of the security/automation system for a first encrypted communication between the first device and the second control panel of the security/automation system, wherein the second encryption key is generated during pairing of a second device with the second control panel for a second encrypted communication between the second device and the second control panel, wherein the first control panel comprises a reset or replacement of the second control panel; and
  resume operation of the one or more devices in the security/automation system, using the backed-up device information downloaded to the first control panel, wherein resuming the operation comprises:
    using the first encryption key generated during pairing of the first device with the second control panel to automatically pair the first device with the first control panel and establish a third encrypted communication between the first device and the first control panel; and
    using the second encryption key generated during pairing of the second device with the second control panel to automatically pair the second device with the first control panel and establish a fourth encrypted communication between the second device and the first control panel.

* * * * *